(12) United States Patent  (10) Patent No.: US 9,097,211 B2
Martinez et al.  (45) Date of Patent: Aug. 4, 2015

(54) SLIDEABLE LINER ANCHORING ASSEMBLY

(75) Inventors: Gonzalo F. Martinez, Stuart, FL (US);
Gary J. Dillard, Wellington, FL (US)

(73) Assignee: United Technologies Corporation, Hartford, CT (US)

( * ) Notice: Subject to any disclaimer, the term of this patent is extended or adjusted under 35 U.S.C. 154(b) by 2063 days.

(21) Appl. No.: 12/134,284

(22) Filed: Jun. 6, 2008

(65) Prior Publication Data

US 2009/0301093 A1 Dec. 10, 2009

(51) Int. Cl.
*F23R 3/60* (2006.01)
*F02K 1/82* (2006.01)

(52) U.S. Cl.
CPC . *F02K 1/822* (2013.01); *F23R 3/60* (2013.01); *Y02T 50/675* (2013.01)

(58) Field of Classification Search
USPC ............. 60/266, 752, 766, 770, 796, 798, 79, 60/799, 800; 415/128, 196, 197
See application file for complete search history.

(56) References Cited

U.S. PATENT DOCUMENTS

| 4,121,768 | A | 10/1978 | Young |
| 4,458,479 | A * | 7/1984 | Reider et al. ................. 60/800 |
| 5,059,055 | A | 10/1991 | DeGress et al. |
| 5,782,294 | A | 7/1998 | Froemming et al. |
| 6,347,508 | B1 | 2/2002 | Smallwood et al. |
| 6,672,833 | B2 * | 1/2004 | MacLean et al. ............. 415/196 |
| 6,895,761 | B2 | 5/2005 | Mitchell et al. |
| 6,904,757 | B2 | 6/2005 | Mitchell et al. |
| 7,017,334 | B2 | 3/2006 | Mayer et al. |
| 7,237,389 | B2 | 7/2007 | Ryan et al. |
| 7,338,244 | B2 | 3/2008 | Glessner et al. |
| 2004/0118127 | A1 | 6/2004 | Mitchell et al. |
| 2005/0155352 | A1 | 7/2005 | Agg |
| 2006/0101827 | A1 | 5/2006 | Ryan et al. |
| 2007/0158527 | A1 | 7/2007 | Farah et al. |
| 2008/0022689 | A1 | 1/2008 | Farah et al. |

* cited by examiner

*Primary Examiner* — Ehud Gartenberg
*Assistant Examiner* — Arun Goyal
(74) *Attorney, Agent, or Firm* — Carlson, Gaskey & Olds, P.C.

(57) ABSTRACT

An example gas turbine engine includes an engine casing and an engine liner within the engine casing. One of the engine casing or the engine liner includes a first attachment structure. The other of the engine casing or the engine liner defines a track guide. A slideable member is moveable within the track guide between an engaged position and a disengaged position. The slideable member includes a second attachment structure engageable with the first attachment structure to secure the engine liner relative the engine casing when the slideable member is in the engaged position.

20 Claims, 3 Drawing Sheets

SLIDEABLE LINER ANCHORING ASSEMBLY

BACKGROUND

An exhaust section of a typical gas turbine engine includes a removable liner secured relative to an exhaust duct. Positioning the liner within the exhaust duct insolates the exhaust duct from the thermal energy of flow through the exhaust. The engine's complex manufacturing tolerances and complicated flow path make securing the liner within the exhaust duct difficult. Thermal energy of flow through the exhaust also expands and contracts the secured liner. A robust liner securing strategy typically accommodates these thermal energy induced fluctuations. Liners in other sections of the engine face similar issues. Liners are often removed from the engine for repair, inspection, etc.

In one securing arrangement, brackets are associated with the exhaust liner and exhaust duct. The brackets each include corresponding apertures. A separate pin is inserted through the apertures, which are aligned during assembly, to support the exhaust liner relative to the exhaust duct. The separate pin typically extends along the entire axial length of the liner. Installing the lengthy, separate pin is difficult because of the distance the separate pin must travel to move between an uninstalled position and an installed position within the bracket apertures. More specifically, accessing areas of the engine that provide adequate clearances for manipulating the lengthy, separate pin during installation is often difficult. As an example, the curved inner wall of some curved exhausts blocks moving the pin to a position appropriate for insertion into the bracket apertures. Removing the pin from the bracket apertures is similarly difficult.

SUMMARY

An example gas turbine engine includes an engine casing and an engine liner within the engine casing. One of the engine casing or the engine liner includes a first attachment structure. The other of the engine casing or the engine liner defines a track guide. A slideable member is moveable within the track guide between an engaged position and a disengaged position. The slideable member includes a second attachment structure engageable with the first attachment structure to secure the engine liner relative the engine casing when the slideable member is in the engaged position.

An example liner anchoring assembly includes a slideable member receivable within a track guide defined by an engine liner or an engine casing. The slideable member is moveable within the track guide between a first position and a second position, the slideable member in the second position is configured to limit more movement of the engine liner relative the engine casing than the slideable member in the first position. A pin structure or an apertured portion translates with the slideable member. The apertured portion receives the pin structure within an aperture when the slideable member is in the second position.

An example method of securing an engine liner includes positioning an engine liner within an engine casing in a first position, and sliding a liner anchoring structure relative the liner and the casing within a guide defined by the liner or the casing. The method includes sliding the liner anchoring structure to secure the liner in the first position during the sliding.

These and other features of the example disclosure can be best understood from the following specification and drawings, the following of which is a brief description:

DETAILED DESCRIPTION OF THE PREFERRED EMBODIMENT

Figure 1:
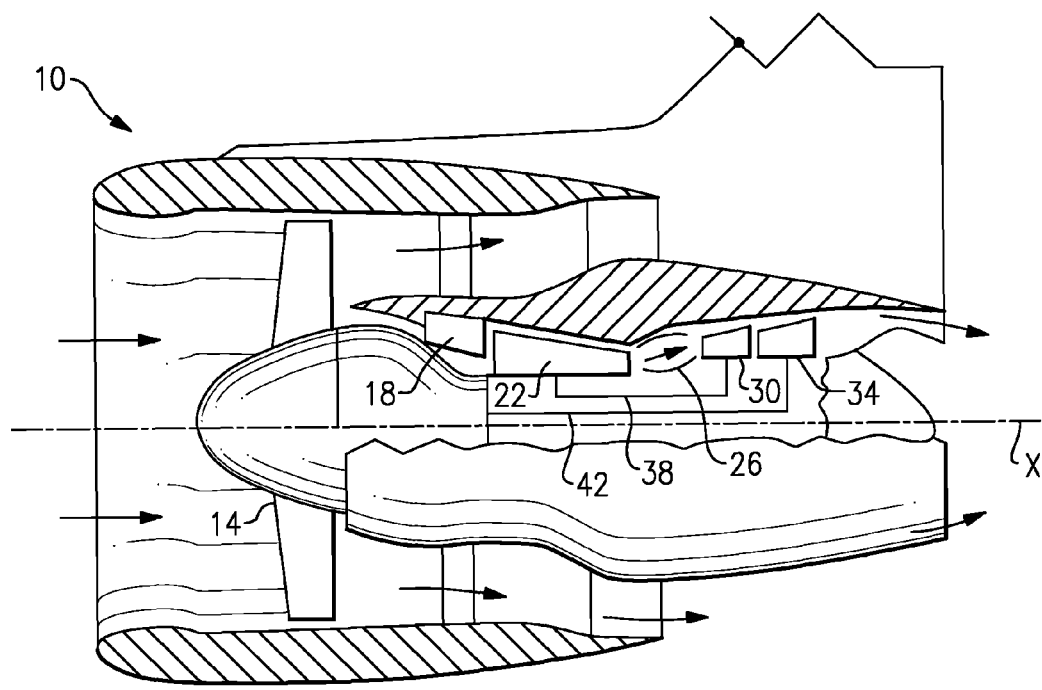
FIG. 1 schematically shows sectional view of an example gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X. During operation, the fan section 14 intakes air, and the compressors 18, 22 pressurize the air. The combustor 26 burns fuel mixed with the pressurized air. The high and low pressure turbines 30, 34 extract energy from the gases exiting the combustor 26.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42. The example method may be applied to other architectures such as a single spool axial design, a three spool axial design, and other architectures.

Figure 2:
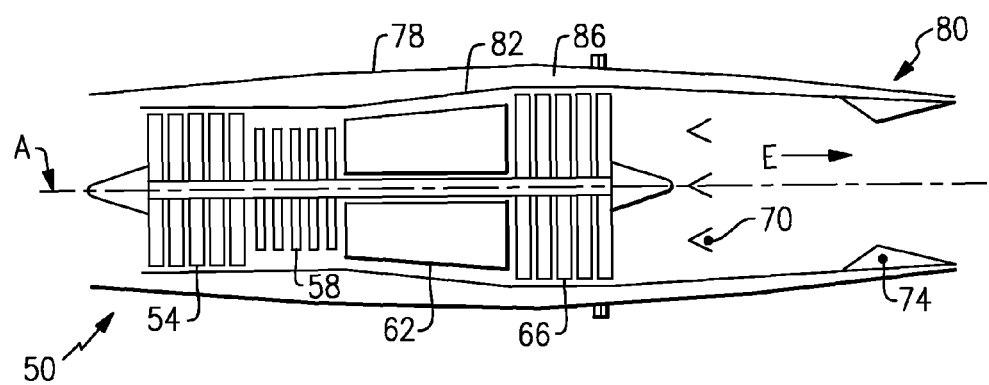
FIG. 2 schematically shows another example gas turbine engine.

Referring to the FIG. 2 schematic, there is shown an example turbo jet engine 50. The turbo jet engine 50 includes a fan section 54, a compressor section 58, a combustor section 62, a turbine section 66, an augmentor section 70 and a nozzle section 74. The compressor section 58, combustor section 62, and turbine section 66 are generally referred to as the core engine. An axis A of the engine 50 is generally disposed and extends longitudinally through the sections. An outer engine duct structure 78, or casing, and an inner cooling liner structure 82 provide an annular secondary fan bypass flow path 86 around a primary exhaust flow path E through an exhaust section 80 of the engine 50. The bypass flow path 86 receives bypass flow from the fan section 54.

Figure 3:
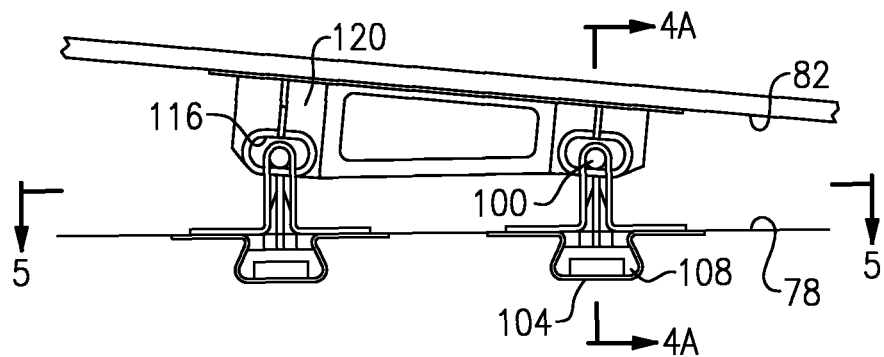
FIG. 3 shows an example liner anchoring assembly within a portion of the FIG. 2 engine.
Figure 4A:
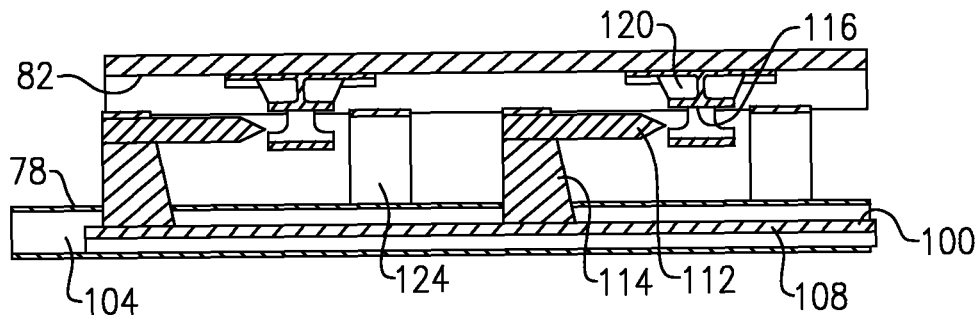
FIG. 4A shows the sectional view through line 4-4 of FIG. 3 with the liner anchoring assembly in a disengaged position.
Figure 4B:
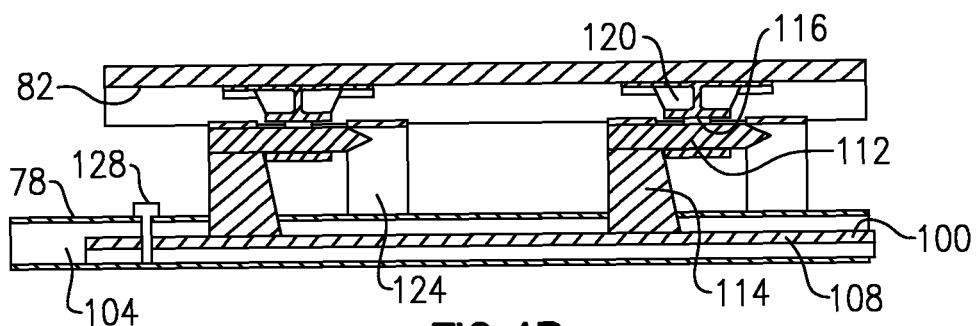
FIG. 4B shows a sectional view through line 4-4 of FIG. 3 with the liner anchoring assembly in an engaged position.

Referring now to FIGS. 3 through 4B with continuing reference to FIG. 2, the example duct structure 78 supports the liner structure 82 with a liner anchoring assembly 100. The example liner structure 82 is a nickel liner structure. The example duct structure 78 comprises titanium materials.

The duct structure 78 defines a plurality of track guides 104 that each receives a track portion 108 of the respective liner anchoring assembly 100. In this example, the track guides 104 are defined along an interior portion of the duct structure 78 and are aligned with the engine axis A such that the liner anchoring assembly 100, when received within a respective one of the track guides 104, extends from the duct structure 78 toward the engine axis A. The example duct structure 78 defines several track guides 104 annularly arranged about the engine axis A.

The liner anchoring assembly 100, a type of slideable member, slides, translates, or otherwise moves within the track guides 104 between the disengaged position of FIG. 4A and the engaged position of FIG. 4B. The example track guides 104 hold the liner anchoring assembly 100 such that relative movements of the liner anchoring assembly 100 are back and forth in a single direction.

In the engaged position, a plurality of pins 112, mounted on pin stands 114 extending from the track portion 108, are received within a plurality of apertures 116 defined by corresponding brackets 120 extending from the liner structure 82. When received, the pins 112 fit within the apertures 116 to limit radial movement of the brackets 120 relative to the pins 112. The pins 112 and brackets 120 thus act as attachment structures securing the liner anchoring assembly 100 to the liner structure 82. Other example attachment structures include hooks or other features appropriate for engaging the brackets 120 relative to the liner anchoring assembly 100 to limit radial movement of the brackets 120.

The liner anchoring assembly 100 secures the liner structure 82 relative the duct structure 78 when the liner anchoring assembly 100 is in the engaged position. A plurality of liner supports 124 space the liner structure 82 from the duct structure 78 and facilitate aligning the apertures 116 with the pins 112 as the pins 112 move to the engaged position.

The pins 112 of the example liner anchoring assembly 100 are each shorter than the overall axial length of the liner structure 82. Pins 112 that are shorter require less movement of the liner anchoring assembly 100 to disengage form the apertures 116 than pins 112 that are longer. Disengaging the pins 112 thus requires less movement of the liner anchoring assembly 100 than if the pins 112 extended the entire length of the liner structure 82. Smaller movements of the liner anchoring assembly 100 require less clearance within the engine 50 than larger movements.

The pins 112 on the example liner anchoring assembly 100 are axially aligned with each other. This arrangement facilitates sliding the liner anchoring assembly 100 in a single direction to move the pins 112 to and from a position received within the apertures 116.

In the installed position of FIG. 4B, screws or similar fasteners 128 may be used to minimize relative linear displacement between the liner anchoring assembly 100 and the duct structure 78 after moving the assembly 100 to the installed position. The fasteners 128 thus prevent the liner anchoring assembly 100 from sliding to a disengaged position. The example threaded fasteners 128 are positioned an area of the engine 50 providing access for securing the threaded fasteners 128 with a pneumatic tool for example.

Although shown as a liner anchoring assembly 100 moving within the track guides 104 defined by the duct structure 78, other examples may include track guides 104 defined by the liner structure 82. In such an example, the liner anchoring assembly 100 slides to engage apertured brackets (not shown) extending from the duct structure 78.

Figure 5:
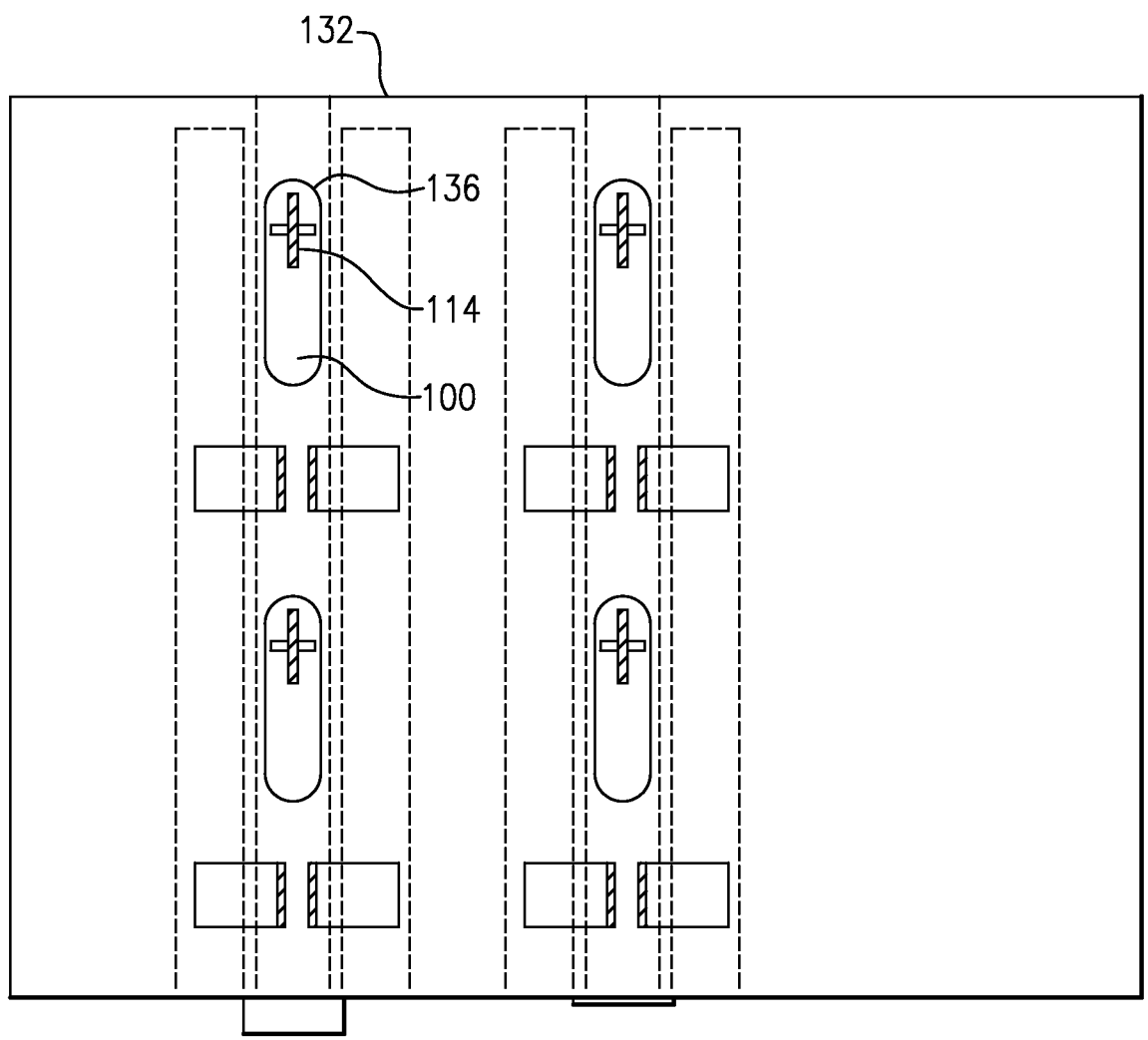
FIG. 5 shows a sectional view through line 5-5 of FIG. 3.

Referring to FIG. 5, in this example, a cover plate 132 lines the duct structure 78 to help hold the liner anchoring assembly 100 within the track guides 104. The pin stands 114 of the liner anchoring assembly 100 extend through apertures 136 defined by the track guides 104. The apertures 136 permit movement of the liner anchoring assembly 100 between the engaged and the disengaged positions.

Although a preferred embodiment has been disclosed, a worker of ordinary skill in this art would recognize that certain modifications would come within the scope of this invention. For that reason, the following claims should be studied to determine the true scope and content of this invention.

We claim:

1. A turbine engine assembly comprising:
   an engine casing;
   a engine liner within the engine casing, at least one of the engine casing and the engine liner including a first attachment structure, the other one of the engine casing and the engine liner defining a track guide; and
   a slideable member moveable within the track guide between an engaged position and a disengaged position, the slideable member including a second attachment structure that is engaged with the first attachment structure to secure the engine liner relative the engine casing when the slideable member is in the engaged position, the second attachment structure disengaged from the first attachment structure when the slideable member is in the disengaged position.

2. The turbine engine assembly of claim 1 wherein one of the first attachment structure and the second attachment structure includes a pin for cooperating with an apertured portion defined by the other of the first attachment structure and the second attachment structure.

3. The turbine engine assembly of claim 2, wherein the pin is engaged with the apertured portion when the first attachment structure is engaged with the second attachment structure, and the pin is disengaged from the apertured portion when the first attachment structure is disengaged with the second attachment structure.

4. The turbine engine assembly of claim 2, wherein the pin is received within an aperture of the apertured portion when the first attachment structure is engaged with the second attachment structure.

5. The turbine engine assembly of claim 1 wherein the second attachment structure includes a pin.

6. The turbine engine assembly of claim 1 wherein the slideable member slides between the engaged position and the disengaged position in a direction aligned with an engine axis defined by the engine casing.

7. The turbine engine assembly of claim 1 including a support secured to the engine liner that spaces the engine liner relative the engine structure when the slideable member is in the disengaged position.

8. The turbine engine assembly of claim 1 wherein the engine casing comprises an engine exhaust casing.

9. The turbine engine assembly of claim 1 wherein the engine liner comprises an engine exhaust liner.

10. The turbine engine assembly of claim 1, wherein the second attachment structure is spaced from the first attachment structure when the slideable member is in the disengaged position within the track guide.

11. A liner anchoring assembly comprising:
    a slideable member at least partially receivable within a track guide defined by an engine liner or an engine casing, the slideable member moveable within the track guide between a first position and a second position, the slideable member in the second position is configured to limit more movement of the engine liner relative the engine casing than the slideable member in the first position, wherein at least one of a pin structure and an apertured portion translates with the slideable member, the apertured portion receiving the pin structure within an aperture when the slideable member is in the second position.

12. The liner anchoring assembly of claim 11 wherein the slideable member slides between the first position and the second position in a direction generally aligned with an engine axis defined by the engine casing.

13. The liner anchoring assembly of claim 12 wherein the track guide limits radial movement of the slideable member relative an axis defined by the engine casing.

14. The liner anchoring assembly of claim 11 wherein the pin structure is axially aligned with another pin structure that translates with the slideable member.

15. The liner anchoring assembly of claim 11, wherein the pin structure is spaced from the apertured portion when the slideable member is in the first position.

16. A method of securing an engine liner comprising:
   (a) positioning an engine liner within an engine casing in a first position;
   (b) sliding a liner anchoring structure relative the liner and the casing within a guide defined by at least one of the liner and the casing; and
   (c) securing the liner in the first position during the sliding by moving the liner anchoring structure from a disengaged position within the guide to an engaged position within the guide.

17. The method of claim 16 including positioning a pin within an aperture during the sliding.

18. The method of claim 16 wherein the liner anchoring structure slides in a direction aligned with an engine axis defined by the engine casing.

19. The method of claim 16 including securing the liner anchoring structure to limit sliding of the liner anchoring structure relative the engine liner and the engine casing.

20. The method of claim 16, wherein the liner anchoring structure is held within the guide in the disengaged position and in the engaged position.

\* \* \* \* \*